United States Patent [19]

Palmer

[11] Patent Number: 5,108,245

[45] Date of Patent: Apr. 28, 1992

[54] DEVICE FOR THE AXIAL TRANSPORT OF ELONGATED OBJECTS

[75] Inventor: Larry R. Palmer, Roane County, Tenn.

[73] Assignee: Tennessee Tool and Engineering, Inc., Oak Ridge, Tenn.

[21] Appl. No.: 643,263

[22] Filed: Jan. 22, 1991

[51] Int. Cl.⁵ .............................................. B23Q 7/06
[52] U.S. Cl. .................................. 414/17; 414/18; 414/745.9; 414/224; 414/225; 198/468.11
[58] Field of Search ............... 414/745.1, 745.7, 745.9, 414/16, 17, 18, 20, 222, 224, 225, 749, 751; 198/463.5, 468.2, 468.11

[56] References Cited

U.S. PATENT DOCUMENTS

| 4,311,031 | 1/1982 | Schwarze | 414/225 X |
| 4,929,138 | 5/1990 | Breuning | 414/16 |
| 4,938,654 | 7/1990 | Schram | 414/752 X |

FOREIGN PATENT DOCUMENTS 1238938 6/1986 U.S.S.R. .................. 414/745.7

OTHER PUBLICATIONS

PCT WO86/04045, Jul. 17, 1986, Jarreby.

Primary Examiner—Robert J. Spar
Assistant Examiner—Donald W. Underwood
Attorney, Agent, or Firm—Pitts & Brittian

[57] ABSTRACT

A handling unit for axially transporting elongated objects from a first location to a second location such as from a feed table into a machining unit where machining operations are to be performed upon the object. A feed table, or corresponding depository, supports a plurality of the objects to be transported in parallel relationship, and provision is made to advance the objects so that a single object is placed in a pickup location. An axially movable push rod then engages the end of the object when desired to accomplish the axial transport. This push rod is operated by a rod-less cylinder such that the cylinder and the push rod are in parallel alignment thereby reducing the length of the device to the length of the cylinder. Various embodiments are described, together with that of an "unloader" to receive the objects after machining and place them on a receiving table or the like.

20 Claims, 5 Drawing Sheets

DEVICE FOR THE AXIAL TRANSPORT OF ELONGATED OBJECTS

TECHNICAL FIELD

The present invention relates generally to the axial transport of elongated objects, and more particularly to a loader-unloader device for use in the handling of elongated objects that are to be subjected to machining operations in an automated machining device.

BACKGROUND ART

In the machining industry there are numerous devices that perform one or more machining operations on various parts, such as elongated shafts and other elongated objects. Most often, these are automated machines that are computer controlled. Objects to be machined are typically fed into one end of the machine, and then exit the opposite end when all machining steps have been completed. In order to have high productivity with such a machine, some mechanism is required to feed the object in, and then withdraw it from the other end.

One such automated machine is the MAZAK Multiplex 610 as manufactured by MAZAK of Japan. This machine has an internal input chuck to grasp an elongated object in a proper time sequence, perform any desired machining operations, and then pass it to an output chuck. If desired or necessary, additional machining operations can be performed while the output chuck holds the object. After all machining operations are completed, the output chuck releases the object for withdrawal of the completed part through the opposite end of the machine. All of the motions and machining operations are automatically controlled with a computer.

These automated machines can be equipped with a loader to feed raw parts into the machine and with an unloader to removed finished parts. The loader typically has a table for holding a plurality of objects that are to be machined. In proper time sequence, a push rod of the loader is advanced to engage the end of one of the objects and push that object into the machine where it is grasped by the input chuck; the loading push rod is then withdrawn. This is repeated each time an object is to be inserted into the machine. An unloader for these machines is quite similar to the loader except that instead of pushing, it grasps the object and draws it out of the machine.

Typically the loader mechanisms, including a loader for the MAZAK machine, use a push rod attached to a chain that travels over a set of sprockets, one of which is driven through an electronic clutch from a drive motor. The clutch is engaged whenever a part is to be delivered to the automated machine. Position-sensitive switches control the speed and extent of travel of the push rod, and then the withdrawal of the push rod when the object has been delivered to the machine. The unloader is constructed similarly, except that there is a pull rod to remove the object from the machine. In order to accommodate objects of up to ten feet in length, such loaders and unloaders typically are each thirteen feet in length. In the case of the MAZAK machine, the total length of loader, machine and unloader is forty-five feet. It will therefore be recognized that the combination occupies a considerable space within a machine shop.

Other known loader/unloader devices similarly utilize excessive space due to the serially-connected operators and push rod.

Accordingly, it is an object of the present invention to provide a mechanism for the handling of elongated objects which does not require excessive space adjacent to equipment for which the object handling is to be accomplished.

It is another object of the present invention to provide a loading mechanism for automatically loading an elongated object, from a supply of a plurality of such objects, into a machine for the performance of various machining operations thereon.

A further object of the present invention is to provide a mechanism for automatically grasping and withdrawing an elongated object from a machine wherein various machining operations have been accomplished, the operation of the unloading mechanism being substantially the same as the loading mechanism.

These and other objects of the present invention will become apparent upon a consideration of the drawings and a complete description thereof that follow.

DISCLOSURE OF THE INVENTION

In accordance with the present invention, there is provided a feeder table means (or other "depository") for holding a plurality of the elongated objects which are to be moved axially, as into a device for performing machining operations on the objects, with means associated with the feeder table means for advancing the objects to a pickup location where the objects are oriented with a long dimension parallel to the direction they are to be moved. An axially-movable pusher rod means is arranged so that, when actuated, an end of the pusher rod means bears against an outboard end of the object. This pusher rod means is mounted from a carrier that is connected to a piston within a rod-less cylinder means, the rod-less cylinder means being mounted so as to be parallel to the direction of pusher rod motion. To be used as an unloader, a puller rod means is provided with a grasping device to engage the object for withdrawing the same from the machine to a position on a table where a plurality of finished elongated parts can be stored. This puller rod means of the unloader is operated by a rod-less cylinder in a manner similar to that of the loading device.

BEST MODE FOR CARRYING OUT THE INVENTION

Figure 1:
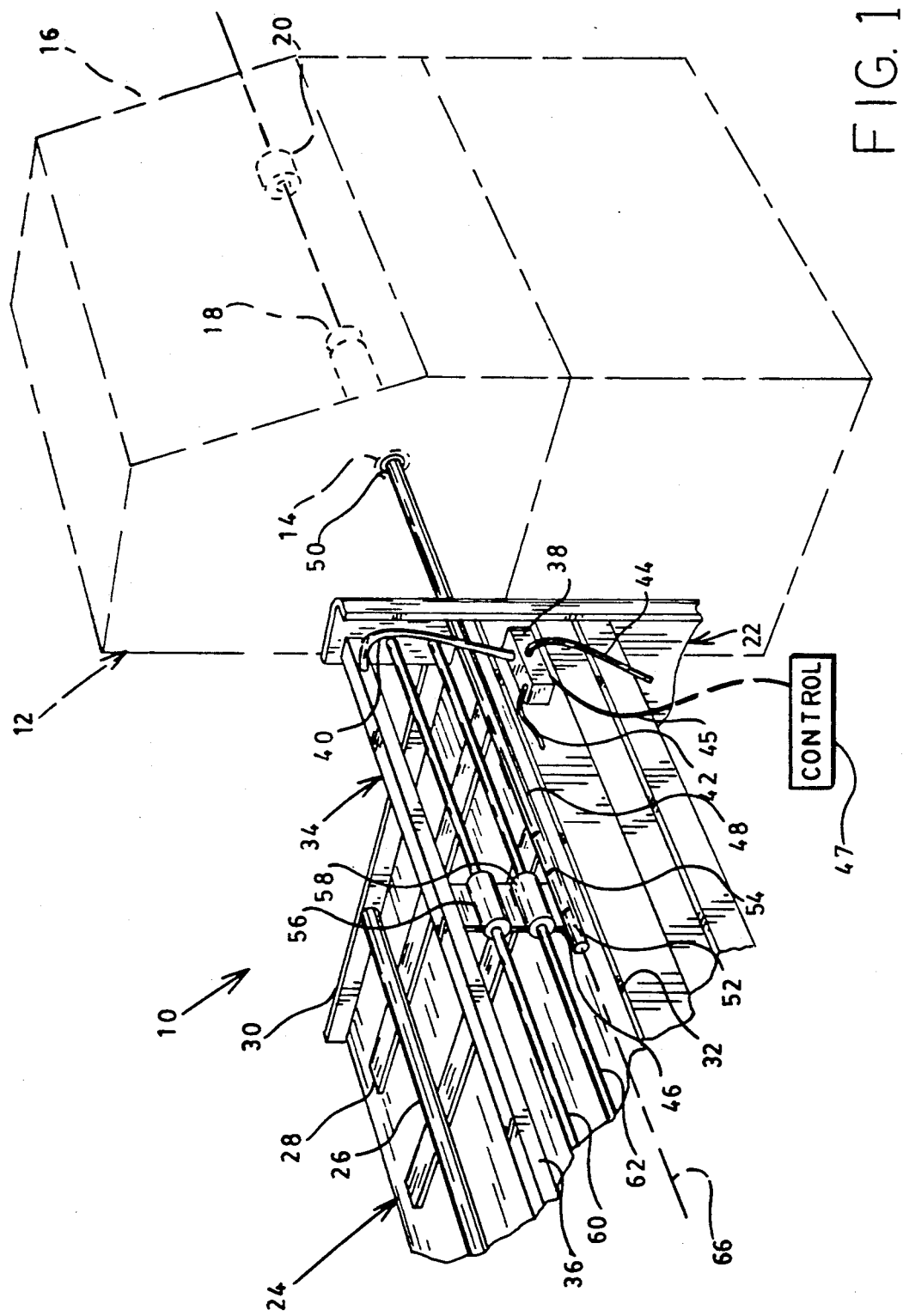
FIG. 1 is an isometric drawing, partially cut-away, depicting a loading unit of the present invention as installed adjacent to an automatic computer-controlled machining unit, this being one application of the present invention. It will be understood that a similar unloader unit can be installed adjacent the opposite end of the machining unit.

An embodiment of the present invention is illustrated generally at 10 in FIG. 1. It is shown mounted adjacent to a automated machining unit 12 (such as a MAZAK Multiplex 610 machine); however, it will be understood that this could be any kind of device toward which elongated articles are be fed. This particular machine is shown as having an entry port 14 in a enclosure 16, an internal input chuck 18 and output chuck 20.

Figure 3:
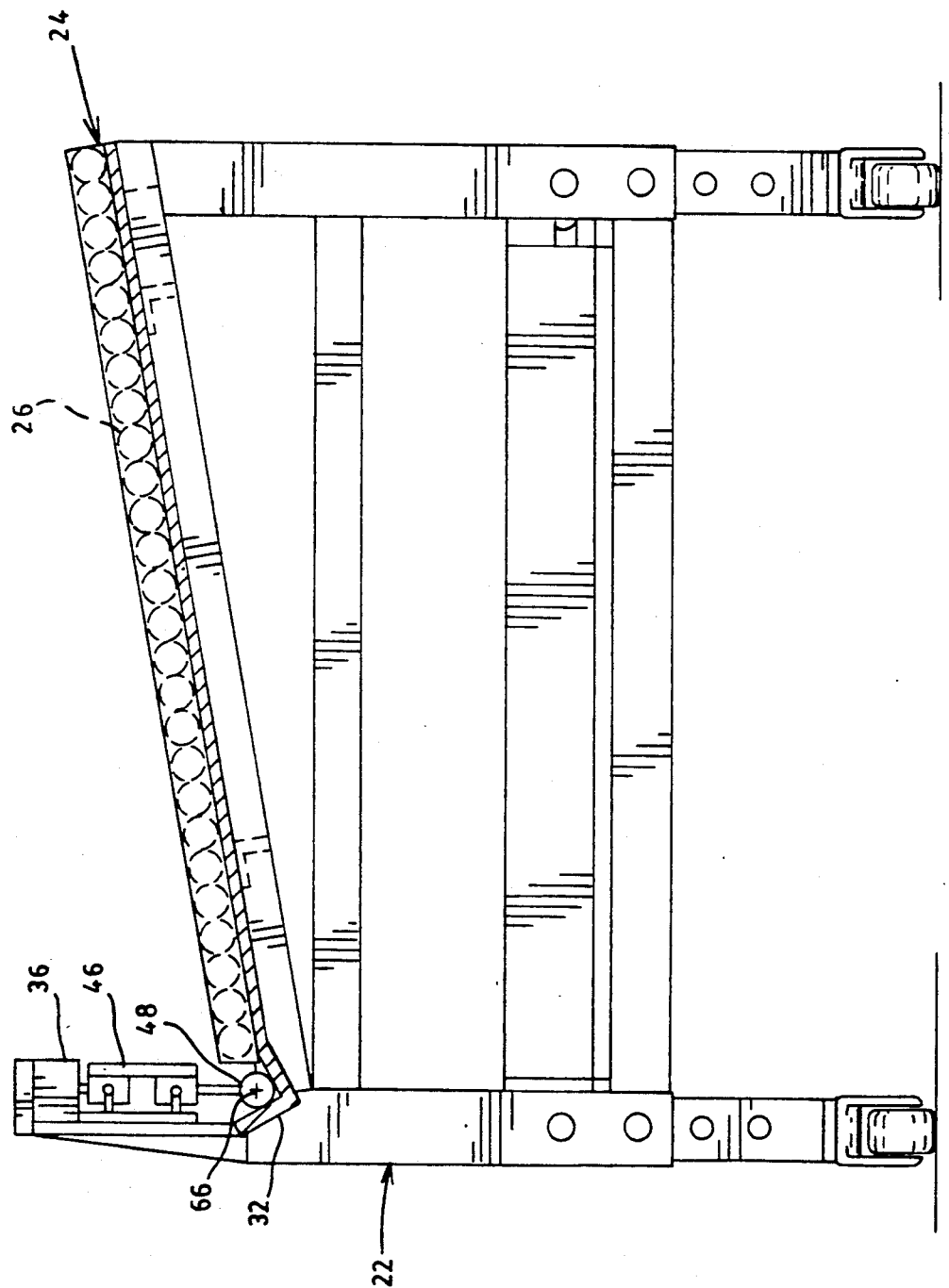
FIG. 3 is a cross-sectional view of the loading unit of FIG. 1 taken at 3—3 of FIG. 2.

The invention includes a general frame 22 which, as shown in FIG. 3, can be adjustable in height so as to be adapted to different receiving units. This frame 22 supports a feed table means 24 whereby a plurality of elongated objects 26 can be stored. Of course, it will be understood that any depository for holding a plurality of the elongated objects can be used. This feed table means includes, for example, a hopper-like device. In this embodiment the feed table means 24 is sloped so that the objects 26, which are depicted as being round in cross-section, can roll to a pickup position (see FIG. 3). Further, in this preferred embodiment the feed table means 24 is provided with raised rails 28 so as to reduce rolling friction with the objects 26. The feed table means 24 is provided with a "stop" 30 against which one end of each object 26 is aligned so as to arrive at the pickup position in proper orientation. A raised lip 32, which forms a trough, establishes this pickup position.

Associated with the feed table means 24 is an operator means 34 used for the axial movement of a singular object 26 toward the machine 12. Mounted from the frame 22 is a rod-less cylinder 36 such as a Norgren Model C45732BM160BL cylinder. This cylinder has a length sufficient to accommodate objects of the same length. For example, a cylinder six feet long can be used to handle objects of up to six feet in length. A piston element 37 (see FIG. 4) within the cylinder is moved along the cylinder using pressurized air supplied from a control valve 38 through lines 40, 42 directed to opposite ends of the cylinder 36. The valve 38 is typically mounted on the frame 22 (although it may be mounted on other equipment), and air is supplied to the valve 38 as with line 44. The valve can be operated by signals via lead 45 from a computer or any other controller 47 so as to function with a time sequence corresponding to the need for introducing objects into the machine 12. The valve can also be operated manually if desired.

As part of the operator means 34, a plate member 46 is attached to the piston within the rod-less cylinder 36. Attached at a lower edge of this plate member is a push rod 48 having a distal end 50 which bears against one of the objects 26 so as to deliver the object through the port 14 into the machine 12. The opposite end 52 of the push rod 48 is provided with a plurality of transverse openings 54 whereby the push rod 48 can be positioned on the plate member 46 to effectively change the length of the push rod so as to accommodate objects 26 of different length. This construction causes the push rod 48 to reciprocate along its own axis 66 as the piston is moved within the cylinder 36.

In order to assure pure axial motion of the push rod 48, the plate 46 is provided with bearing means as at 56, 58. These bearing means, which typically are Thompson ball bushings, can move along fixed guide rods 60, 62, respectively, during the reciprocative movement of the plate member 46 and the push rod 48. The plate member 46 and the bearing means 56, 58 in this figure are shown rather schematically: they are more accurately depicted in FIG. 4.

Figure 2:
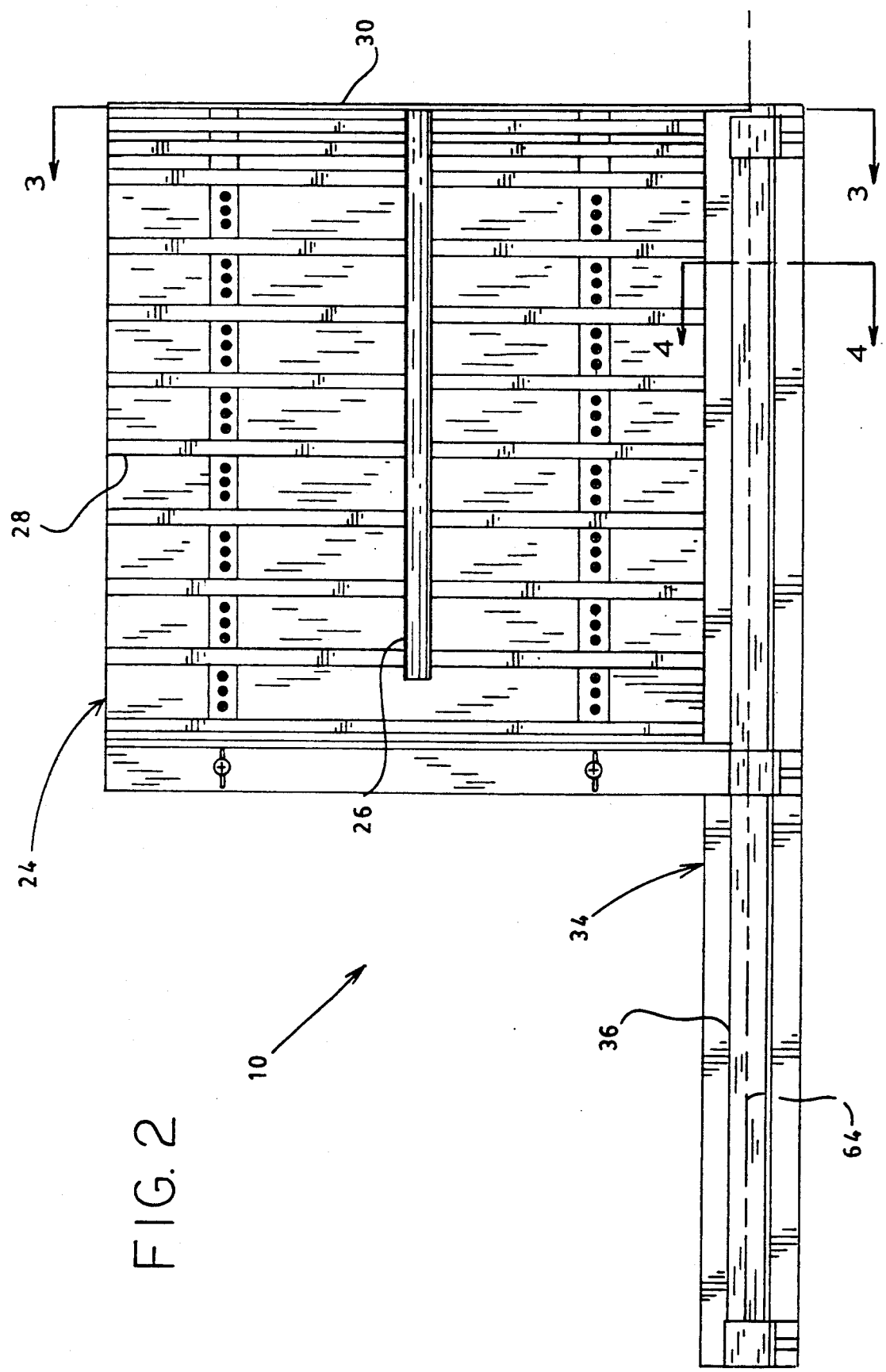
FIG. 2 is a top view of the loading unit of FIG. 1.
Figure 4:
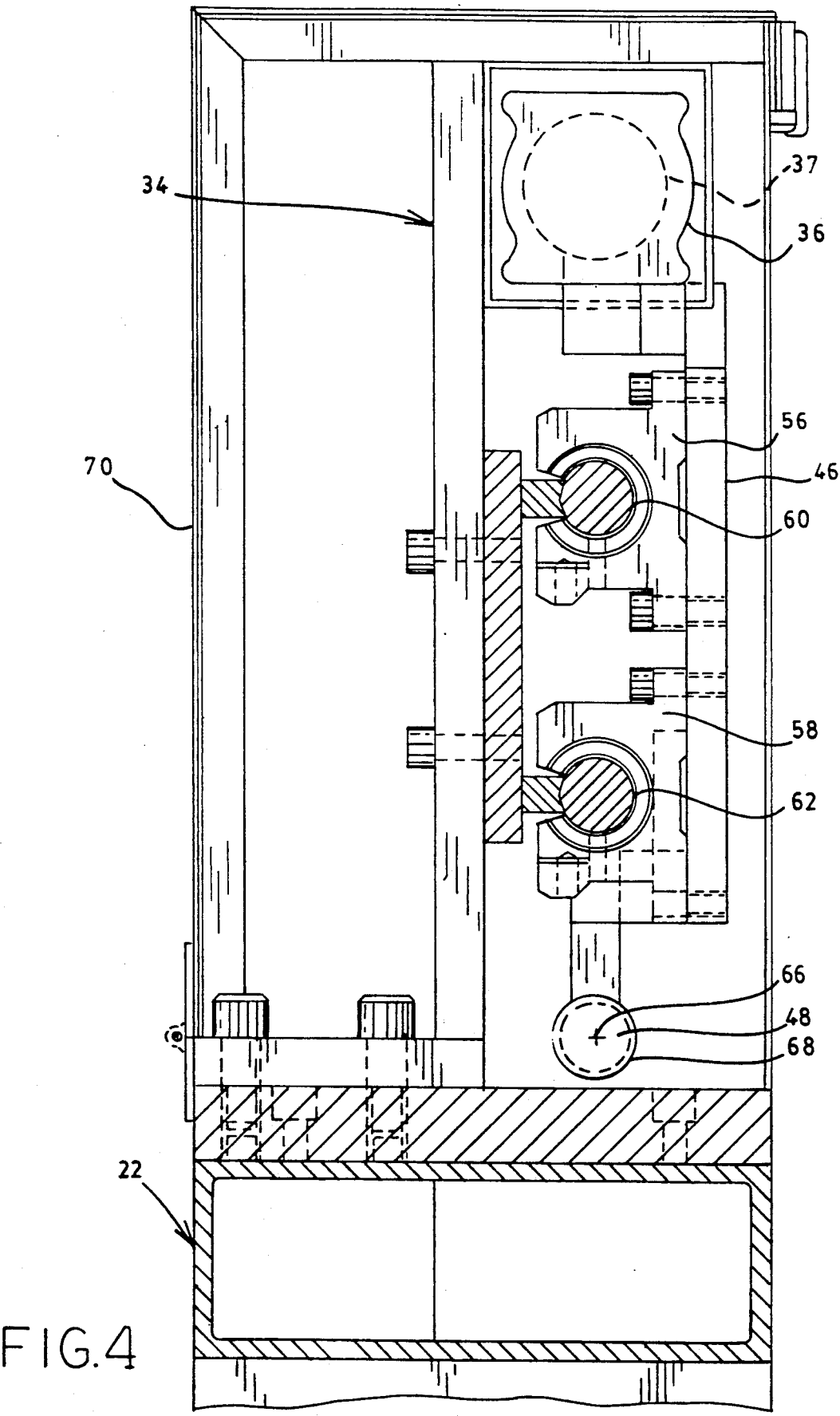
FIG. 4 is a partial cross-sectional view of the operating mechanism of the loading unit of FIG. 1 taken at 4—4 of FIG. 2.

A top view of the feed table means 24 and the operator means 34 is shown in FIG. 2. This view further illustrates one of a plurality of objects 26 supported thereon by the rails 28, with one end of the object proximate the stop element 30. This figure also indicates where the cross-sections depicted in FIGS. 3 and 4 are taken. The axis 64 of the cylinder 36 is indicated: this axis is parallel to the axis 66 of the push rod 48 (see FIG. 1).

A vertical cross-section of the loader of the present invention is shown in FIG. 3. In this embodiment the rails 28 of FIG. 1 are not shown. This illustrates that the feed table means 24 is sloped so that the objects 26 held thereon automatically move toward the trough formed by the lip 32 so as to position an object 26 to be axially aligned with the axis 66 of the push rod 48. When in this position, the object can be moved axially as the push rod is axially moved toward the machine 12 (see FIG. 1). When the push rod 48 is again withdrawn, another object moves into position against the lip 32 so as to be ready for insertion into the machine when desired. Although the present invention was developed primarily for the loading and unloading relative to an automatic machining device, it will be understood that the axial transport of the elongated objects can be for any other purpose.

An enlarged (approximately ¾ full size) vertical cross-section of the operator means 34 is shown in FIG. 4. In this view it can be seen that the plate member 46 depends from the cylinder 35 and supports the bearing means 56 and 58. The guide shafts 60 and 62 are supported in these bearing means so as to provide for axial movement of the push rod 48 along its axis 66. The tip of the distal end of the push rod 48, in this embodiment, carries a spring-loaded cap 68. Although not shown, this cap can move axially a short distance to compensate for an inexact location of the distal end from the end of objects to be engaged. Further, this cap can be fabricated from (or include) a material having a low coefficient of friction so as to minimize drag during contact between the push rod 48 and the next object being supported upon the feed table means 24. If desired, the operator means 36 can be protected with a removable dust cover 70.

Figure 5:
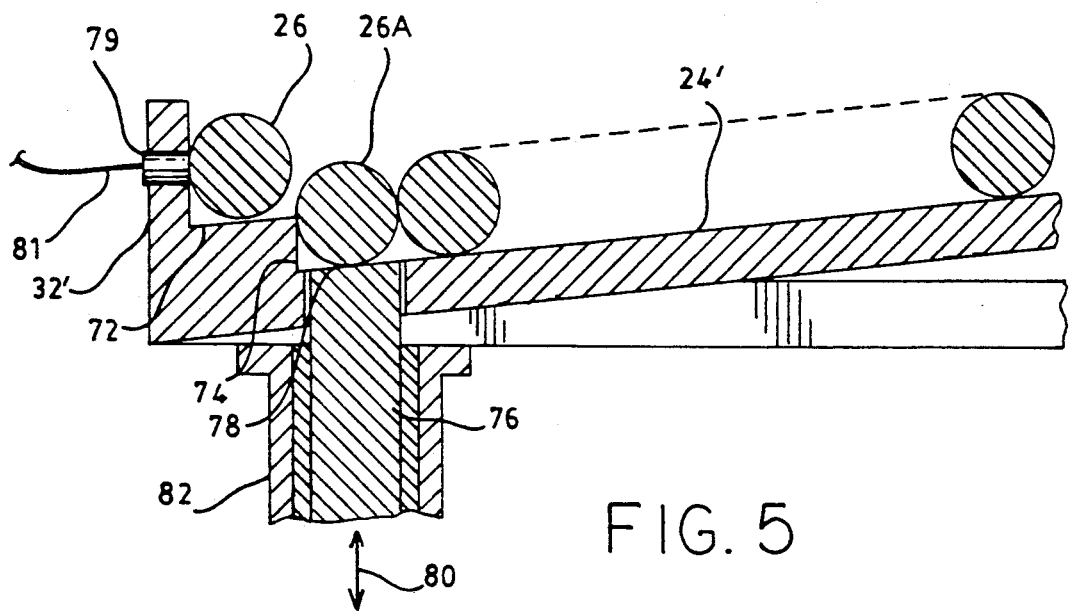
FIG. 5 is a partial cross-sectional view of an alternate embodiment of means for aligning elongated objects with a push rod member of the loader of FIG. 1. This can be contrasted with the embodiment illustrated in FIG. 4

In order to reduce the drag between the push rod 48 and the first of the objects 26 remaining of the feed table means 24, another embodiment of delivering the objects to the pickup position has been developed. This embodiment is illustrated in FIG. 5. In this embodiment the lip 32' is formed to provide a support surface (trough) 72 which is elevated from, but has essentially the same slope as, the feed table means 24'. This construction forms a step 74 which prevents contact between an object 26 that is supported on the support surface 72 and the next object 26A that awaits on the feed table means 24'. When the object 26 has been advanced by the push rod 48 (as in FIG. 1) and the space on the support surface 72 is empty, elevator rods 76 are operated to lift object 26A to a level where it rolls onto the support surface 72. To accomplish this, the distal end 78 of the elevator rods is also sloped to assist in this rolling motion. The elevator rods reciprocate in a direction indicated by the double ended arrow 80 and move within a bearing unit 82. It will be understood that at least two elevator rods are required to lift another object from the surface of the feed table means 24' onto the support surface 72.

Figure 6:
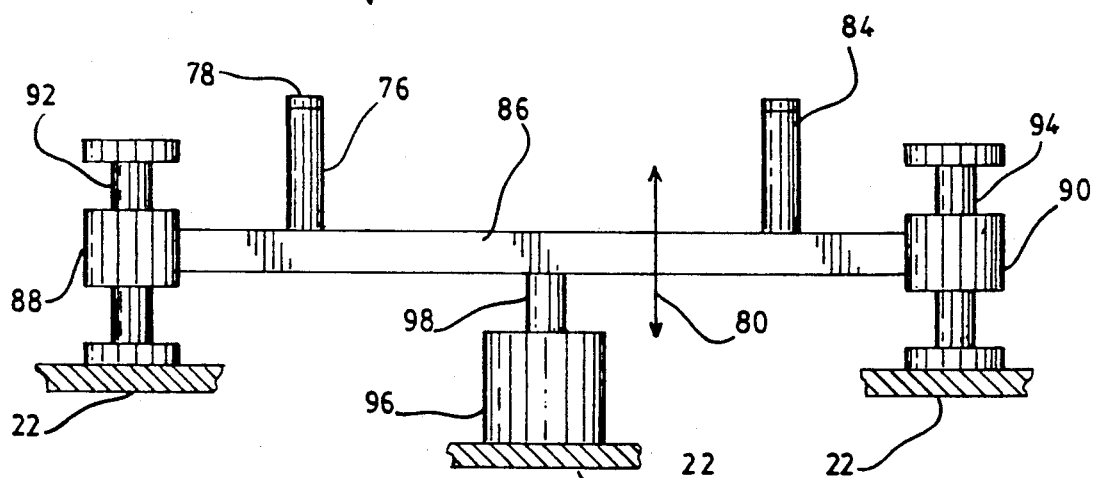
FIG. 6 is a drawing schematically illustrating operating means for the structure depicted in FIG. 5.

Although a number of mechanisms can be used to effect the reciprocal motion of the elevator rods 76 of FIG. 5, one typical system is illustrated schematically in FIG. 6. In this embodiment, two elevator rods 76, 84 (there can be more) are attached to a cross-bar 86 by any suitable means. This cross-bar 86 is supported by bearing units 88, 90 that encircle guide rods 92, 94; these guide rods being supported on at least one end from the frame 22. The cross-bar 86 is moved in the afore-mentioned reciprocating motion, as indicated by the arrow 80 of this and FIG. 5, by a pneumatic cylinder 96 and piston rod 98. Of course, other operating means can be used to move the cross-bar 86 in the desired direction.

In some applications of the loader of the present invention it may be desirable to ascertain whether an object 26 is in position for engagement by the push rod 48. This can be accomplished, as illustrated in FIG. 5, with an object sensor 79. This sensor can be any conventional device, such as a pressure-sensitive switch, an electromagnetic sensor, etc. Electrical leads 81 from the sensor are connected into the control circuitry of the invention so as to halt axial movement of the push rod if no object is detected at the pickup position.

Referring again to FIG. 1, the operation of the present invention can be best explained. When used as a loading device for a machine such as illustrated at 12, a plurality of elongated (e.g., cylindrical) objects 26 are placed upon the feed table means 24 such that one end of each substantially abuts the stop 30. Since the table is sloped downwardly (typically 3-4 degrees) toward the operator means 34, these objects all move until the leading object rests against the lip 32. In this position its axis is aligned with the axis 66 of the push rod 48. At a selected time, as determined by operations within the machine, the valve 38 is operated so as to deliver fluid (air) to the cylinder 36 to cause its piston to move in a direction toward the machine 12. This causes the push rod 48 to be also advanced in that same direction such that it carries the first object into the machine 12. At the completion of the stroke of the push rod 48, as may be determined by a magnetically operated switch (not shown), the fluid flow is stopped by the valve 38 and directed to the opposite end of the cylinder 36. This withdraws the push rod 48 to its extreme withdrawn position such that another object can be "loaded" in the pickup position against the lip 32. This "loading" can be solely by gravity, as in the embodiment of FIG. 3, or by a combination of gravity and elevator rods as in FIG. 5. Other corresponding "loading" mechanism will be known to persons skilled in the art.

Figure 7:
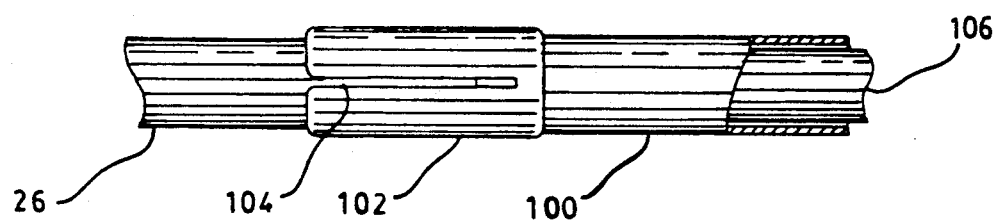
FIG. 7 is a fragmentary and partially cutaway drawing of typical means for grasping an object as associated with an unloader unit.

An unloader unit for withdrawing finished objects from the machining unit 12 functions in essentially the same manner. The operation of this unloader can be understood by referring to FIG. 7. Instead of pushing on the end of an object, the distal end of a pull rod 100 of the loader is provided with a grasping means, typically in the form of a "finger" collet 102 that has longitudinal slots 104 at several locations. This collet 102 thus frictionally can hold an object 26 during the withdrawal step from the machine. When the object 26 has cleared the machine, it can be released from the collet 102 using a rod 106 to push the object 26 from the collet 102. This rod 106 is actuated by any suitable control means associated with the apparatus. The object 26 is then free to be deposited on a storage depository (not shown) which can be similar to the slopped table associated with the loader except that the table would slope downwardly from the position of the pull rod. The pull rod 100 is mounted from a rod-less cylinder (not shown) in the same manner as the push rod 48 of the loader mechanism.

Although the present invention has been described for use with the feeding or loading of elongated objects into a machining unit, it can be used wherever elongated objects are to be moved axially for any reason. Further, although the objects have been discussed as being circular in cross-section, the present invention can be adapted to accommodate objects having other cross-sectional geometries. For example, the rails 28 on the feed table means 24 (or the receiving table of an unloader) can be belt-like such that objects having non-circular cross-sections can be moved toward a pickup position. These belt-like rails can be moved continuously or intermittently to accomplish the desired loading of the objects into the pickup position. The same types of belt-like rails would be used on the receiving table means as well.

From the foregoing, it will be understood by persons skilled in the art that a compact and efficient device has been developed for the axial transport of elongated objects. The length of the device has been substantially reduced from those of the prior art through the use of a rod-less cylinder such that the maximum length only approximates the length of the push rod (or pull rod) used for the axial movement.

Although the present invention has been described principally for use with an automatic machining unit for performing given machining operations on elongated objects, this is for the purpose of illustrating one application of the device and not for the purpose of limiting the invention. Rather, the invention is to be limited only by the appended claims and their equivalents when read together with this detailed description of the invention.

I claim:

1. A device for achieving axial transport of elongated objects, each object having a long axis, from a first location to a second location, which comprises:

a frame member;

a depository associated with said frame member for holding a plurality of said elongated objects with their long axes being parallel and oriented parallel to a direction of said axial transport;

an alignment means on said frame member for receiving one of said objects for said axial transport;

moving means associated with said depository for moving one of said objects to said alignment means;

a rod-less cylinder mounted on said frame member, said rod-less cylinder having an internal piston member;

a push rod member, having a long axis aligned with said direction of axial transport, attached to said internal piston member of said rod-less cylinder with a mounting means whereby reciprocation of said internal piston member results in reciprocation of said push rod member, said push rod member having a distal end to engage an end of said object at said alignment means to thereby axially transport said object when said push rod member is moved axially; and means for effecting axial movement of said internal piston member within said rod-less cylinder to thereby produce axial movement of said push rod member and said object from said first location to said second location.

2. The device of claim wherein said depository is a table means mounted on said frame member, said table means oriented so as to be downwardly inclined toward said alignment means, whereby said moving means is assisted by gravity acting upon objects supported on said table means.

3. The device of claim 2 wherein said objects to be transported axially have a substantially circular cross-section, and said moving means comprises a plurality of rails supported on said table means to minimize friction between said objects and said table means as gravity moves said objects toward said alignment means.

4. The device of claim 1 wherein said alignment means is a trough means having a long axis substantially aligned with said direction of axial movement whereby an object positioned within said trough means is aligned with said long axis of said push rod member such that axial movement of said push rod member achieves said axial movement of said object.

5. The device of claim therein said mounting means for said push rod member comprises:
  a plate means having a first edge attached to said piston member of said rod-less cylinder unit and a second and opposite edge attached proximate a first end of said push rod member;
  first and second bearing members attached to said plate means;
  first and second guide rods each having opposite ends attached to said frame member, said first and second guide rods having long axes substantially parallel with said long axis of said push rod member, said first and second guide rods engaged by said first and second bearing members, respectively, whereby axial movement of said piston member in said rod-less cylinder results in axial movement of said plate means along said first and second guide rods and axial movement of said push rod member.

6. The device of claim 1 wherein said means for effecting axial movement of said internal piston within said rod-less cylinder comprises:
  a pneumatic control valve;
  means for providing pressurized air to said pneumatic control valve;
  output air lines connecting said pneumatic control valve to opposite ends of said rod-less cylinder; and
  signal means connected to said pneumatic control valve to cause said pneumatic control valve to operate to direct pressurized air from said means for providing pressurized air to one end of said rod-less cylinder through one of said output air lines.

7. A device for achieving axial transport of elongated objects, each object having a long axis, from a first location to a second location, which comprises:
  a frame member;
  a trough means on said frame member and aligned with a direction of said transport for receiving one of said objects for said axial transport;
  table means mounted on said frame member for supporting a plurality of said objects with their long axes being parallel and parallel to said trough means, said table means oriented so as to be downwardly inclined toward said trough means;
  moving means associated with said table means for moving one of said objects to said trough means;
  a rod-less cylinder mounted on said frame member, said rod-less cylinder having an internal piston member;
  a push rod member, having a long axis aligned with said direction of axial transport, attached to said internal piston member of said rod-less cylinder with a mounting means whereby reciprocation of said internal piston member results in reciprocation of said push rod member, said push rod member having a distal end to engage an end of said object at said trough means to thereby axially transport said object when said push rod member is moved axially; and
  means for effecting axial movement of said internal piston member within said rod-less cylinder to thereby produce axial movement of said push rod member and said object from said first location to said second location.

8. The device of claim 7 wherein said objects to be transported axially have a substantially circular cross-section, and said moving means comprises a plurality of rails supported on said table means to minimize friction between said objects and said table means as gravity moves said objects toward said trough means.

9. The device of claim 7 therein said mounting means for said push rod member comprises:
  a plate means having a first edge attached to said piston member of said rod-less cylinder unit and a second and opposite edge attached to a first end of said push rod member;
  first and second bearing members attached to said plate means;
  first and second guide rods each having opposite ends attached to said frame member, said first and second guide rods having long axes substantially parallel with said long axis of said push rod member, said first and second guide rods engaged by said first and second bearing members, respectively, whereby axial movement of said piston member in said rod-less cylinder results in axial movement of said plate means along said first and second guide rods and axial movement of said push rod member.

10. The device of claim 7 wherein said trough means is at an elevation above an elevation of said table means, and further comprises lifting means associated with said frame means to individually lift one of said objects from said table means to said trough means to be aligned with said push rod member.

11. The device of claim 10 wherein said lifting means comprises:
  a plurality of elevator rods mounted below said table means, said elevator rods adapted for vertical reciprocatable movement, said elevator rods having an upper surface with a slope substantially corresponding to said slope of said table means; and
  actuator means for vertically reciprocating said elevator rods at a selected time to cause said elevator rods to lift said one object from said table means to said elevation of said trough means.

12. A device for achieving axial transport of elongated objects, each object having a long axis, from a storage location to a second location within a machine for performing machining operations on said objects, which comprises:
  a frame member positioned adjacent said machine;
  a trough means on said frame member and aligned with a direction of said transport into said machine for receiving one of said objects for said axial transport;

storage table means mounted on said frame member for supporting a plurality of said objects with their long axes being parallel and parallel to said trough means, said storage table means oriented so as to be downwardly inclined at a selected slope toward said trough means;

moving means associated with said storage table means for moving one of said objects to said trough means;

a rod-less cylinder mounted on said frame member, said rod-less cylinder having an internal piston member;

a push rod member, having a long axis aligned with said direction of axial transport, attached to said internal piston member of said rod-less cylinder with a mounting means whereby reciprocation of said internal piston member results in reciprocation of said push rod member, said push rod member having a distal end to engage an end of said object at said trough means to thereby axially transport said object into said machine when said push rod member is moved axially toward said machine; and means for effecting axial movement of said internal piston member within said rod-less cylinder to thereby produce axial movement of said push rod member and said object from said trough means into said machine.

13. The device of claim 12 wherein said objects to be transported axially have a substantially circular cross-section, and said moving means comprises a plurality of rails supported on said table means to minimize friction between said objects and said table means as gravity moves said objects toward said trough means.

14. The device of claim 12 therein said mounting means for said push rod member comprises:

a plate means having a first edge attached to said piston member of said rod-less cylinder unit and a second and opposite edge attached to a first end of said push rod member;

first and second bearing members attached to said plate means;

first and second guide rods each having opposite ends attached to said frame member, said first and second guide rods having long axes substantially parallel with said long axis of said push rod member, said first and second guide rods engaged by said first and second bearing members, respectively, whereby axial movement of said piston member in said rod-less cylinder results in axial movement of said plate means along said first and second guide rods and axial movement of said push rod member.

15. The device of claim 12 wherein said means for effecting axial movement of said internal piston within said rod-less cylinder comprises:

a pneumatic control valve;

means for providing pressurized air to said pneumatic control valve;

output air lines connecting said pneumatic control valve to opposite ends of said rod-less cylinder; and signal means connected to said pneumatic control valve to cause said pneumatic control valve to operate to direct pressurized air from said means for providing pressurized air to one end of said rod-less cylinder through one of said output air lines.

16. The device of claim 12 wherein said trough means is at an elevation above an elevation of said table means, and further comprises lifting means associated with said frame means to individually lift one of said objects from said table means to said trough means to be aligned with said push rod member, said lifting means having a plurality of elevator rods mounted below said table means, said elevator rods adapted for vertical reciprocatable movement, and actuator means for vertically reciprocating said elevator rods at a selected time to cause said elevator rods to lift said one object from said table means to said trough means.

17. The device of claim 12 further comprising object-sensing means associated with said trough means to provide a signal with regard to presence of said one of said objects within said trough means for axial transport by said push rod means.

18. The device of claim 12 wherein said distal end of said push rod means is provided with a cap means adapted for axial movement to compensate for an inexact location of said distal end from said end of said object to be engaged by said distal end.

19. The device of claim wherein said distal end of said push rod means is provided with a cap means adapted for axial movement to compensate for an inexact location of said distal end from said end of said object to be engaged by said distal end when said push rod is used to push said object from said first location to said second location.

20. The device of claim 1 wherein said distal end of said push rod means is provided with a finger collet means to frictionally engage said end of said object when said push rod is used to pull said object from said first location to said second location, said finger collet means including rod means to disengage said object from said finger collet means when said object is in said second location.

* * * * *